Dec. 9, 1941.   W. T. GOLLWITZER   2,265,134
CLUTCH
Filed Nov. 8, 1938

Inventor:
Walter T. Gollwitzer,
By Bell, Wallace & Cannon
Attorneys

Patented Dec. 9, 1941

2,265,134

UNITED STATES PATENT OFFICE 2,265,134

CLUTCH

Walter T. Gollwitzer, Euclid, Ohio, assignor to Addressograph-Multigraph Corporation, Wilmington, Del., a corporation of Delaware Application November 8, 1938, Serial No. 239,563

8 Claims. (Cl. 192—24)

This application is a continuation in part of my application Serial No. 221,841, filed July 28, 1938.

This invention relates to clutches and the objects of the invention are to prevent the driving and driven portions of a clutch from becoming united until a predetermined relation between the means driving and the means driven by the clutch is established but at the same time to avoid impressing those stresses on the driving and driven portions that tend to distort or otherwise impair such portions; to afford relative movement between movement transmitting means associated with the clutch and thereby enable at least one part of such movement transmitting means to be formed integrally with a part of the clutch; and to urge the separable portions of the clutch toward each other through the medium of an element capable of movement relative to another element.

Other objects of the invention are to yieldingly urge a movable part of a clutch toward another portion thereof and thereby insure prompt engagement of such movable part with said other portion when such movable part is freed to the action of the means so urging it; to retract such a movable part away from said other portion of the clutch against the action of the means yieldingly urging it toward said other portion of the clutch to thereby effect separation of the driving and driven portions of the clutch; to effect such retraction by the force being transmitted through the clutch; and to prevent engagement of the movable part of the clutch with the other portion of the clutch until a predetermined relation between such parts is established.

Further objects are to provide a novel rapidly acting clutch of simple and economical but long-lived and sturdy construction and of efficient, accurate and positive operation.

Figure 1:
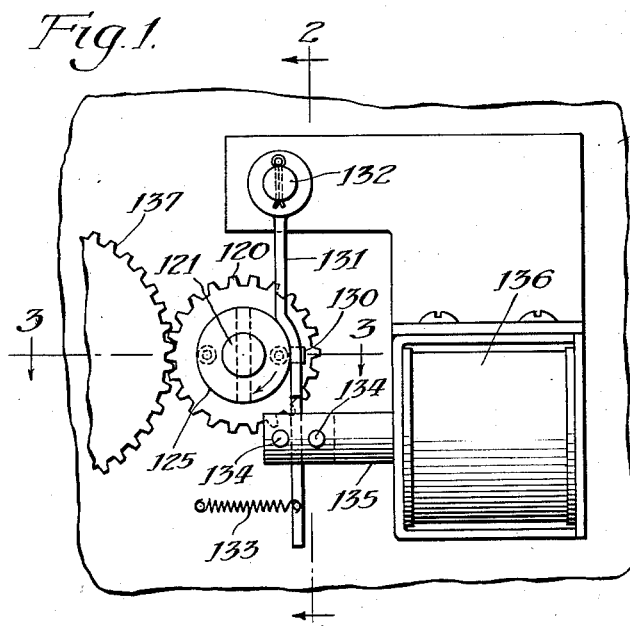
Figure 2:
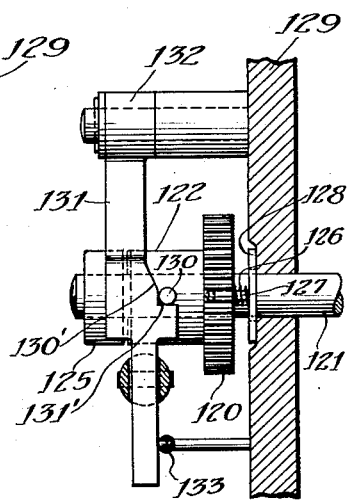
Figure 3:
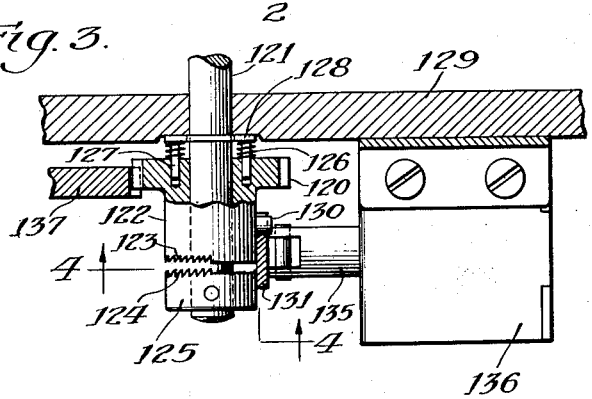
Figure 4:
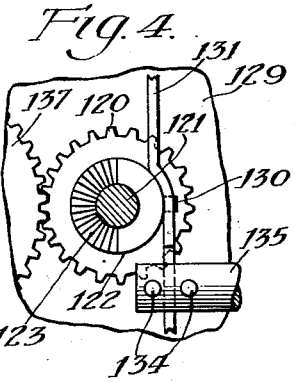
Figure 5:
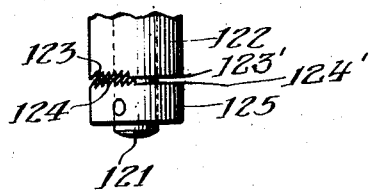
Figure 6:
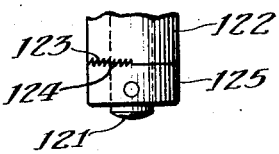

A selected embodiment of my invention is illustrated in the accompanying drawing wherein Fig. 1 is a side elevational view of one form of my novel clutch;

Figs. 2 and 3 are views taken substantially and respectively on the lines 2—2 and 3—3 on Fig. 1;

Fig. 4 is a fragmentary detail view taken substantially on the line 4—4 on Fig. 3; and Figs. 5 and 6 are fragmentary detail views illustrating the manner in which engagement of the separable portions of the illustrated clutch is effected.

The preferred form of my novel clutch shown in the accompanying drawing includes a gear 120 which is rotatably mounted on the shaft 121, this gear including a hub 122 having clutch teeth 123 thereon that are urged toward clutch teeth 124 on a collar 125 fast on the shaft 121. The clutch teeth 123 are urged toward the clutch teeth 124 by springs 126 disposed about pins 127, that are fast in a disc 128 and axially slidable in the gear 120. The springs 126 are disposed between the disc 128 and the gear 120 and serve to urge the disc into engagement with a fixed frame member 129 as well as to urge the clutch teeth 123 toward the clutch teeth 124.

A pin 130 fast in the hub 122 engages a cam surface 130' on the plate 131, pivotally mounted as indicated at 132 and urged toward the periphery of the hub 122 by a spring 133. The plate 131 extends between spaced pins 134 provided on the core 135 of the solenoid 136. When the solenoid is energized the plate 131 is retracted from engagement with the pin 130 and thereupon the springs 126 urge the gear 120 and hub 122 and the clutch teeth 123 on the hub toward the clutch teeth 124 on the collar 125.

Release of the gear 120 and hub 122 to the effect of the springs 126 whereby the clutch teeth 123 move toward the clutch teeth 124 does not necessarily promptly connect the gear 120 with the shaft 121 through the collar 125 for it is essential that the angular relation between the shaft 121 and a shaft (not shown), driven by the gear 137 and which is a part of the driven parts, be maintained. In view of this the clutch teeth 123 are provided on but a portion of the end of the hub 122 and likewise the clutch teeth 124 are provided on but a coextensive portion of the adjacent face of the collar 125. The remaining portions 123' and 124' of the adjacent faces respectively of the hub and collar are flat and in the clutch shown in the accompanying drawing the flat face on the collar 125 is substantially flush with the bottoms of the teeth 124 adjacent thereto while the flat face on the adjacent end of the hub 122 is substantially flush with the tops or ends of the teeth 123 adjacent thereto. Hence, until each and every one of the clutch teeth 123 are aligned with each and every one of the clutch teeth 124, the teeth 124 ride on the flat face 123' of the hub 122 which prevents the clutch teeth from interengaging. When all of the clutch teeth 123 are aligned with all of the clutch teeth 124, the gear 137 is connected to the shaft 121 to rotate therewith. This can only occur at one point in the revolution of the shaft 121 which is the point at which the clutch teeth 124 ride off the flat face of the hub 122 and seat in the clutch teeth 123. When this occurs interconnection is established between the shaft 121 and the gear 137 and each time this occurs the shaft and gear are interconnected in the same angular relation since the angular relation between the shaft 121 and collar 125 is fixed as is the angular relation between the gear 137 and hub 122. It therefore follows that the driving and driven portions of the clutch can only be connected when they are in a predetermined relationship. Fig. 5 illustrates the manner in which the clutch teeth 124 seat on the flat face on the hub 122 prior to the time all of the clutch teeth 123 and 124 are in alignment with each other while Fig. 6 illustrates the manner in which the clutch teeth engage when in alignment.

Once the teeth 123 and 124 are seated in engagement with each other the gear 120 rotates with the shaft 121 so long as the solenoid 136 remains energized to keep the plate 131 out of engagement with the hub 122. When the solenoid is deenergized the spring 133 returns the plate into engagement with the hub 122 and then in the course of rotation of the hub the pin 130 rides along the cam surface 130' and thereupon the teeth 123 are withdrawn from the teeth 124 so that when the pin 130 seats on the stop edge 131' the driven parts are held against further movement until the solenoid 136 is again energized to withdraw the stop edge 131' from engagement with the pin 130 to permit the springs 126 to force the teeth 123 toward the teeth 124 and effect engagement of the clutch in the manner described above.

As illustrated, the clutch teeth 123 and 124 are arranged to extend over one-half of the end of the clutch member on which they are provided but in any event the extent of such engaging members should be such, when the teeth are engaged, that the stresses attendant to the transmission of the driving force through the clutch member are substantially uniformly distributed in contradistinction to the condition that would prevail if the clutch teeth or other engaging members were confined to a too restricted part of the members on which they are provided. The substantially uniform distribution of the stresses as described above is also promoted by the interengagement of the ends of the clutch members adjacent the teeth. It is because of the foregoing arrangement that my novel clutch possesses the desirable attribute of long life and does not function to shear or otherwise separate the elements thereof from the parts connected or connectable thereto.

It will be apparent from the foregoing description that I have provided a novel clutch which is particularly suitable for maintaining the angular relationship between a driving shaft and a driven shaft constant. The clutch is particularly useful in calculating, printing and similar machines where it is often necessary that such relationship be maintained. It will be noted that the same means which permits engagement of the clutch holds the clutch disengaged and that this means also acts to insure disengagement of the clutch at the end of a cycle of operation, accurate operation of such means being assured by reason of the fact that the means is spring-urged into its normal position.

Many other advantages and novel features of the clutch of this invention will be apparent to one skilled in the art, and while I have illustrated and described a selected embodiment of my invention it is to be understood that this is capable of variation and modification and I therefore do not wish to be limited to the precise details set forth but desire to avail myself of such changes and alterations as fall within the purview of the following claims.

I claim:

1. In a clutch of the class described, a rotatable shaft, a pair of clutch members, one of said clutch members being connected to the shaft in predetermined angular relationship therewith, the other of said clutch members being rotatable relative to the shaft and having means connected thereto in predetermined angular relationship therewith, urging means for effecting relative movement between the clutch members to effect engagement of said members one with the other, retaining means for holding said clutch members out of engagement with each other against the action of the urging means, clutching means for interconnecting the clutching members for conjoint movement and including a plurality of teeth located at a predetermined position on one clutch member that are substantially coextensive and engageable with a plurality of teeth on the other clutch member when the teeth are in alignment to thereby interconnect the clutch members for conjoint movement, the portion on one of said members adjacent the teeth thereon having the face thereof disposed below the plane in which the tops of said teeth lie and the portion on the other of said members adjacent the teeth thereon having the face thereof disposed in or above the tops of such teeth to be engageable with the teeth on the other of said members to prevent engagement of the teeth of the clutching means until all of the teeth on one clutch member are in alignment with the corresponding teeth on the other clutch member whereby the clutch member connected to the shaft, and therefore the shaft, and the means connected to the other clutch member in predetermined angular relation therewith are interconnected in predetermined angular relationship upon interengagement of the teeth.

2. In a clutch of the class described, a rotatable shaft, a pair of clutch members, one of said clutch members being fixed to the shaft, the other of said clutch members being rotatable relative to the shaft, means urging the rotatable member toward the fixed member, means for retaining the rotatable member against the action of the urging means, a set of clutch teeth located at a predetermined position on one of said members and substantially complementary to and engageable with a set of clutch teeth located at a predetermined position on the other of said members upon alignment of the sets of teeth with each other in the course of relative rotation between said members when the retaining means is rendered ineffective and the rotatable member is freed to the action of the urging means, the portion on one of said members adjacent the teeth thereon having the face thereof disposed below the plane in which the tops of said teeth lie and the portion on the other of said members adjacent the teeth thereon having the face thereof disposed in or above the tops of said teeth to be engageable with the clutch teeth on the other of said members to prevent engagement of said sets of teeth with each other until all of the teeth in each set are in alignment with corresponding teeth in the other set whereby the fixed member, and therefor the shaft, and the rotatable member are connected for conjoint movement in predetermined angular relationship determined by the aforesaid predetermined positioning of said sets of teeth upon interengagement of said teeth.

3. In a clutch of the class described, a rotatable shaft journaled in and extended beyond a frame member, a member fixed on said shaft outwardly of the frame member, a movable member slidably and rotatably mounted on said shaft intermediate the frame and fixed members, means for urging the movable member toward the fixed member, a stop on the movable member, an abutment member engageable by said stop member and operative to hold the movable member out of engagement with the fixed member, means for retracting said abutment member from engagement with said stop member to thereby free the movable member to the action of the means urging it toward the fixed member, one of said members having a set of teeth in or below a portion of the face of the end thereof faced toward the other member, said other member having a set of teeth above a portion of the face of the end thereof faced toward the one member and which are substantially complementary to the teeth on the one member, the set of teeth on said other member riding on the remaining portion of the end of the said one member in the rotation of one of said members when the movable member is freed to the action of the urging means and until all of the teeth in each set are in alignment with each other, said urging means causing the teeth of the respective sets to interengage when so aligned to thereby connect the movable member to the fixed member for rotation therewith in predetermined angular relationship.

4. In a clutch of the class described, a rotatable shaft journaled in and extended beyond a frame member, a member fixed to the shaft outwardly of the frame member, a movable member slidably and rotatably mounted on said shaft intermediate the frame and fixed members, means connected to the movable member and engaged with said frame and operative to urge the movable member toward the fixed member, a stop member on the movable member, a retractable abutment member engageable with the stop member and operative to move and hold the movable member out of engagement with the fixed member upon engagement of the stop member therewith, the movable member being freed to the action of the urging means upon retraction of the abutment member from engagement with the stop member, one of said members having a set of teeth in or below a portion of the face of the end thereof faced toward the other member, said other member having a set of teeth above a portion of the face of the end thereof faced toward the one member and which are substantially complementary to the teeth on the one member, the set of teeth on said other member riding on the remaining portion of the end of the said one member in the rotation of one of said members when the movable member is freed to the action of the urging means and until all of the teeth in each set are in alignment with each other, said urging means causing the teeth of the respective sets to interengage when so aligned to thereby connect the movable member to the fixed member for rotation therewith in predetermined angular relationship.

5. In a clutch of the class described, a driven shaft journaled in and extended beyond a frame member, a collar fast on said shaft outwardly of the frame member, a sleeve rotatably mounted on said shaft intermediate said frame member and said collar, a plate disposed about said shaft and slidably engaged with said frame member, means connecting said plate to said sleeve for rotation therewith, spring means interposed between said sleeve and said plate and operative to urge said sleeve toward said collar, a pin on said sleeve, an abutment member engageable by said pin and operative to move and hold said sleeve out of engagement with said collar upon engagement of said pin therewith, and electrically operated means operable when circuit thereto is closed to retract said abutment member from engagement with said pin to thereby free said sleeve to the action of said spring means, said sleeve having a set of teeth in a portion of the end thereof faced toward said collar and arranged with the top of said teeth in or below the plane of the remaining portion of said end, said collar having a like set of teeth on a complementary portion of the end thereof faced toward said sleeve and arranged with the top of said teeth above the plane of the remaining portion of said end of said collar, the teeth on said collar riding on the said remaining portion of said end of said sleeve in the rotation of said collar with said shaft when said sleeve is freed to the action of said spring means and until all of the teeth in one set are in alignment with the teeth in the other set, said spring means causing the teeth to interengage when so aligned to thereby connect said sleeve to said collar and shaft for rotation with said shaft in predetermined angular relationship.

6. In a clutch of the class described, a driven shaft journaled in and extended beyond a frame member, a collar fast on said shaft outwardly of the frame member, a sleeve rotatably mounted on said shaft intermediate said frame member and said collar, a plate disposed about said shaft and slidably engaged with said frame member, means connecting said plate to said sleeve for rotation therewith, spring means interposed between said sleeve and said plate and operative to urge said sleeve toward said collar, a pin on said sleeve, an abutment member engageable by said pin and operative to move and hold said sleeve out of engagement with said collar upon engagement of said pin therewith, electrically operated means operable when circuit thereto is closed to retract said abutment member from engagement with said pin to thereby free said sleeve to the action of said spring means, said sleeve having a set of teeth in a portion of the end thereof faced toward said collar and arranged with the top of said teeth in or below the plane of the remaining portion of said end, said collar having a like set of teeth on a complementary portion of the end thereof faced toward said sleeve and arranged with the top of said teeth above the plane of the remaining portion of said end of said collar, the teeth on said collar riding on the said remaining portion of said end of said sleeve in the rotation of said collar with said shaft when said sleeve is freed to the action of said spring means and until all of the teeth in one set are in alignment with the teeth in the other set, said spring means causing the teeth to interengage when so aligned to thereby connect said sleeve to said collar and shaft for rotation with said shaft in predetermined angular relationship, and means for restoring said abutment member into position to be engaged by said pin when circuit to said electrically operated means is opened, engagement of said pin with said abutment member retracting the teeth on said sleeve from engagement with the teeth on said collar and thereby disconnecting the sleeve from said collar and shaft to interrupt rotation of said sleeve with said shaft.

7. In a clutch of the class described, a driving member, a driven member, one of said members arranged with the face thereof in opposition to a face on the other of said members, complementary and coextensive teeth arranged on a portion of each of said faces, the teeth on one of said members being arranged below the plane of the remaining portion of the face on said one member, the teeth on the other of said members arranged above the plane of the remaining portion of the face on said other member, and operating means for effecting engagement and disengagement of said members, whereby upon engaging operation of the operating means the teeth on said other member will ride on said remaining portion of the face of the said one member until the teeth on both of said members are in alignment whereupon the teeth on each member interengage the teeth on the other member to drive said driven member in a predetermined angular relation with said driving member.

8. In a clutch of the class described, a driving member, a driven member, said driving member and said driven member arranged with a face on each in opposition to the face on the other member, complementary and coextensive teeth arranged on one-half of each of said opposing faces, the teeth on said driven member being arranged below the plane of the remaining half of the face thereon, the teeth on said driving member arranged above the plane of the remaining half of the face thereon, and operating means for effecting engagement and disengagement of the said members, whereby upon engaging operation of the operating means the teeth on said driving member will ride on said remaining half of the face of the said driven member until the teeth on both of said members are in alignment whereupon the teeth on the opposing members interengage to drive said driven member in a predetermined angular relation with said driving member.

WALTER T. GOLLWITZER.